United States Patent [19]
Mizumoto et al.

[11] Patent Number: 6,130,989
[45] Date of Patent: Oct. 10, 2000

[54] MOTOR DRIVE CIRCUIT

[75] Inventors: Masao Mizumoto, Gunma-ken; Takashi Someya, Hanyu; Tetsuya Yoshitomi, Gunma-ken, all of Japan

[73] Assignee: Sanyo Electric Co., Ltd., Osaka, Japan

[21] Appl. No.: 09/351,898

[22] Filed: Jul. 13, 1999

[30] Foreign Application Priority Data

| Jul. 17, 1998 | [JP] | Japan | 10-203971 |
| Jul. 17, 1998 | [JP] | Japan | 10-203972 |
| Jul. 17, 1998 | [JP] | Japan | 10-203973 |
| Jul. 31, 1998 | [JP] | Japan | 10-218201 |

[51] Int. Cl.[7] .................................................. H02P 3/18
[52] U.S. Cl. ......................... 388/815; 318/138; 318/254; 318/439
[58] Field of Search .................................. 388/809–815; 318/254, 138, 439

[56] References Cited

U.S. PATENT DOCUMENTS

| 4,356,437 | 10/1982 | Saito et al. | 318/254 |
| 4,359,674 | 11/1982 | Gotou | 318/138 |
| 4,633,150 | 12/1986 | Inaji et al. | 318/254 |
| 4,667,480 | 5/1987 | Bessler | 62/180 |
| 5,144,209 | 9/1992 | Ingji et al. | 318/254 |
| 5,723,957 | 3/1998 | Ishikawa | 318/254 |
| 5,731,671 | 3/1998 | Adam et al. | 318/254 |
| 5,920,176 | 7/1999 | Blackburn et al. | 318/701 |

*Primary Examiner*—Paul Ip
*Assistant Examiner*—Rina I. Duda
*Attorney, Agent, or Firm*—Hogan & Hartson LLP

[57] ABSTRACT

In a motor, drive transistors (7, 9) are turned off by drive signals I, J output from a control circuit (10) at a point adjacent to a phase changeover point of the energizing to drive coils (1, 2), so that no drive current flows through the drive coils (1, 2). Since the counter electromotive forces of the drive coils (1, 2) become small, the drive current can be eliminated before the drive current sharply rises. As a result, sharp dropping of the drive current can be prevented. This allows variation in rotational torque of a motor to be suppressed, and thus reduces vibrational noise in the motor.

10 Claims, 12 Drawing Sheets

MOTOR DRIVE CIRCUIT

BACKGROUND OF THE INVENTION

1. Field of the Invention

The present invention relates to a motor drive circuit that can reduce fan noise.

2. Description of the Related Art

FIG. 1 is a block circuit diagram illustrating a conventional motor drive circuit.

Referring to FIG. 1, drive coils 1 and 2 are structurally attached in a fixed manner to the stator side of a motor. One end of each coil is grounded via a power source Vcc. A drive current IL1 and a drive current IL2 complementarily flow at every electrical angle of 180°. A Hall element 3 is structurally attached at a predetermined position on the stator side of the motor and is connected between the power source Vcc and the ground to receive the power supply. The Hall element 3 produces a sine wave signal H+ and a sine wave signal H− of opposite phases, according to the relative position between the stator and the rotor. An amplifier 4 compares the sine wave signal H+ with the sine wave signal H− and then produces a rectangular wave signal. A control circuit 5 creates a rectangular wave signal B in an opposite phase based on the sine wave signal A output from the amplifier 4 and then current amplifies and outputs the rectangular wave signals A and B. The Darlington-connected NPN transistors 6 and 7 are connected between the other end of the drive coil 1 and the ground. When a high level rectangular wave signal A is applied to the base of an NPN transistor 6, NPN transistors 6 and 7 are turned on, thus causing a drive current IL1 to flow through the drive coil 1. Similarly, the Darlington-connected NPN transistors 6 and 7 are connected between the other end of the drive coil 2 and the ground. When the rectangular wave signal B of a high level is applied to the base of an NPN transistor 8, NPN transistors 8 and 9 are turned on and a drive current IL2 flows through the drive coil 2. Alternately, flowing the drive current IL1 through the coil 1 and the drive current IL2 through the coil 2 drives the motor.

FIG. 2 shows the waveforms of the drive current IL1 and the drive current IL2. The drive current IL1 (=IL) and the drive current IL2 (=IL) are expressed by the following formula;

$$IL=(VCC-Vsat-Ec)/RL$$

where VCC is a power source voltage; Vsat is a saturation voltage of the drive transistor 7 or 9; Ec is a counter electromotive force; and RL is a component resistance of the drive coil 1 or 2.

Since the counter electromotive force Ec becomes small at the phase changeover point T where the drive current IL1 or the drive current IL2 is switched during the motor running, the drive current IL2 becomes large. However, in actual conditions, the drive current IL at the phase changeover point IL does not efficiently produce the rotational torque because the abrupt change in magnitude of the drive current IL varies the rotational torque of the motor, thus inducing vibration noises of the motor.

SUMMARY OF THE INVENTION

It is an object of the present invention to provide a variable speed motor with reduced noise.

According to the present invention, when a drive current through the first coil and a drive current through the second coil are switched, the first and second drive transistors are turned off. Thus, since an abrupt change of the coil current is prevented, a silent motor can be realized.

The off duration of each of the first drive transistor and the second drive transistor does not depend on the amplitude or period of a sine wave signal but is constant. This feature allows the motor noise to be certainly reduced.

Moreover, as the off duration of both the first and second drive transistors is controlled according to temperature changes, the cooling efficiency of a motor can be improved.

Motor noise can be further reduced by curving the trailing edge of the motor drive current.

BRIEF DESCRIPTION OF THE DRAWINGS

These and other objects, features, and advantages of the present invention will become more apparent upon a reading of the following detailed description and drawings, in which.

DESCRIPTION OF THE PREFERRED EMBODIMENTS

Embodiments of a motor drive circuit according to the present invention will be described below with reference to the attached drawings.

Figure 1:
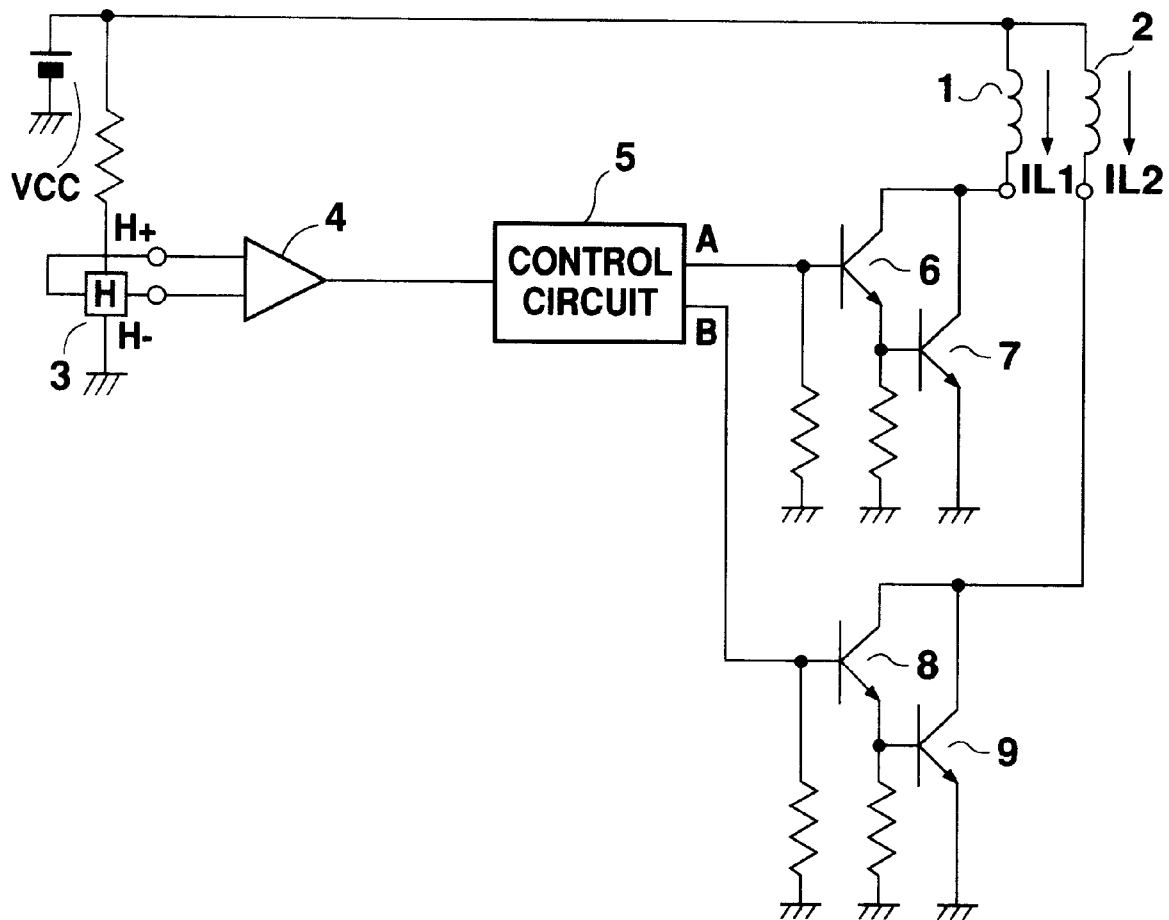
FIG. 1 is a circuit diagram illustrating the configuration of a previous motor drive circuit.
Figure 2:
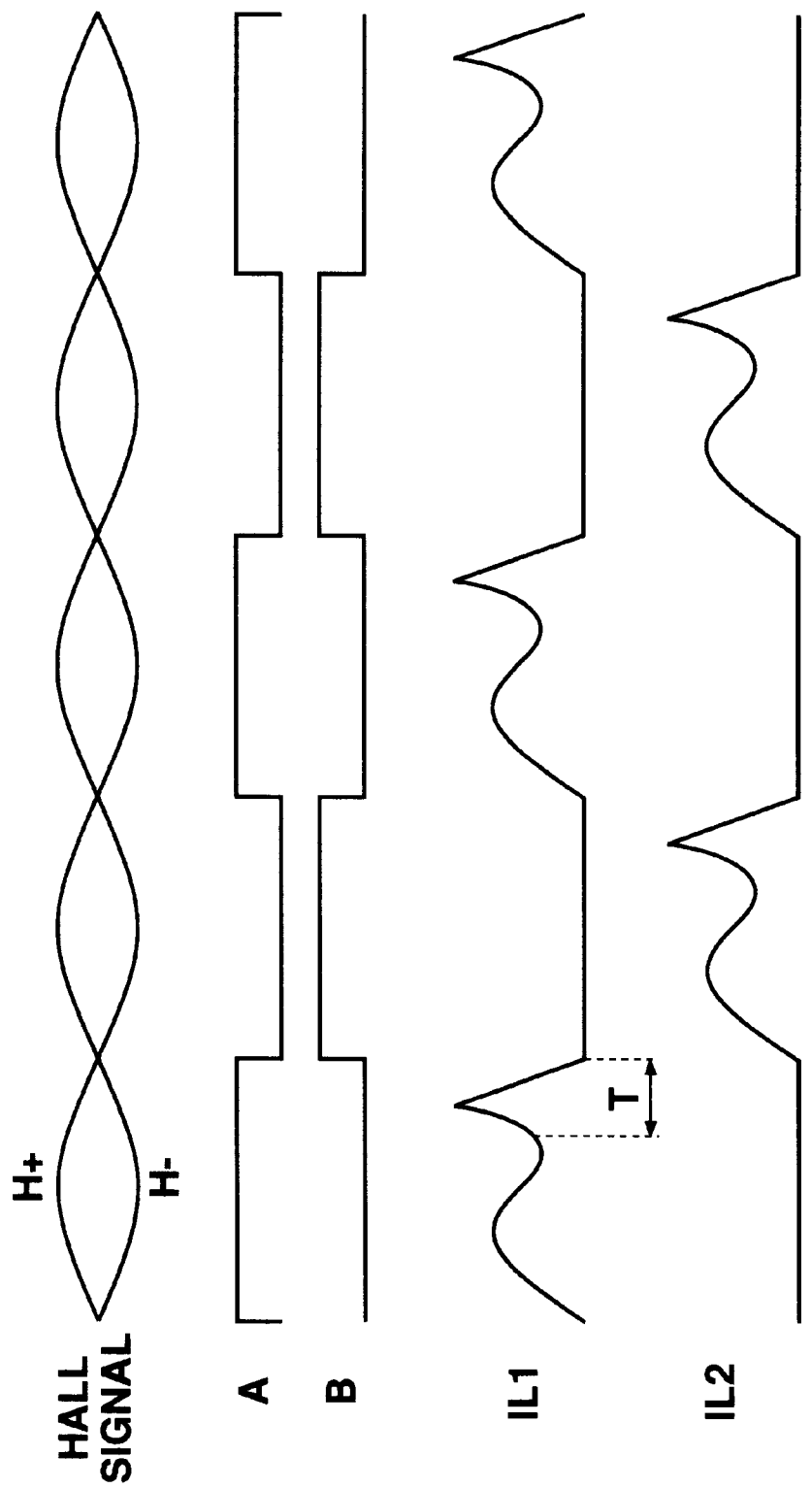
FIG. 2 is a diagram schematically illustrating current waveforms at various points of the motor drive circuit of FIG. 1.
Figure 3:
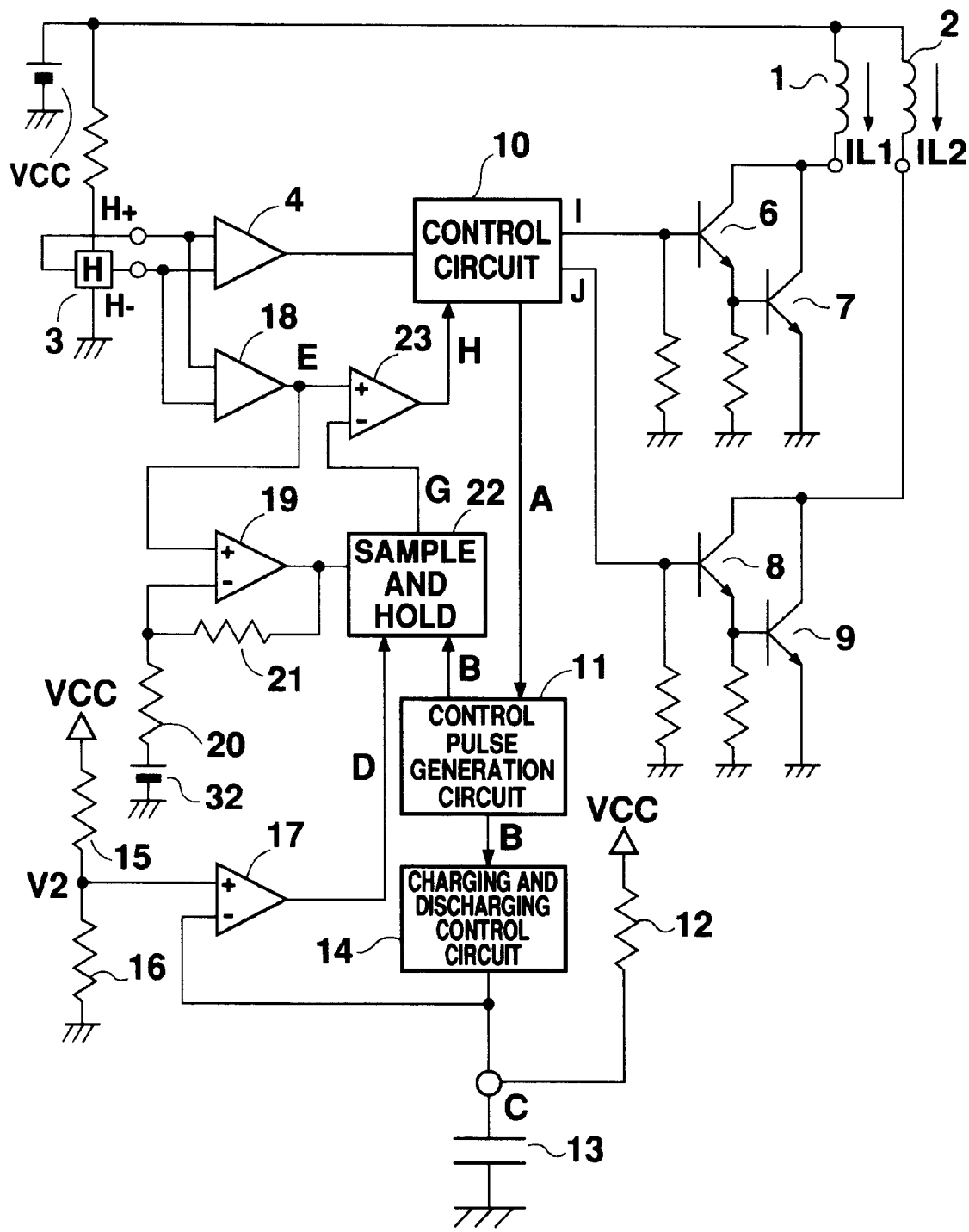
FIG. 3 is a diagram illustrating the configuration of a motor drive circuit according to an embodiment of the present invention.
Figure 4:
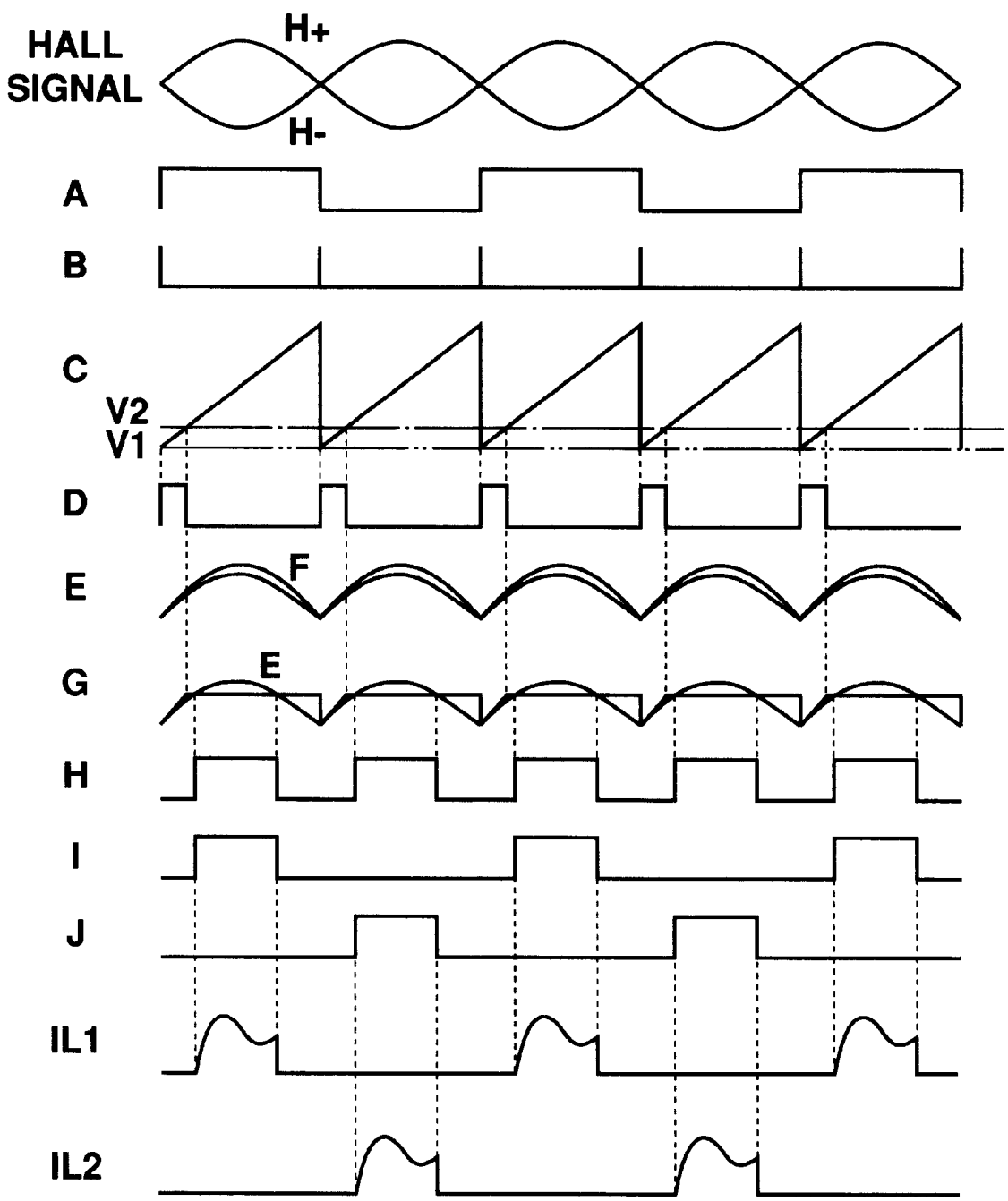
FIG. 4 is a diagram illustrating current waveforms at various points of the motor drive circuit of FIG. 3.

FIG. 3 is a circuit block diagram illustrating a motor drive circuit according to the present embodiment. In FIG. 3, elements corresponding to described above in FIG. 1 will be given the same reference numerals and their explanation will not be repeated. FIG. 4 depicts waveforms showing the operation of the motor drive circuit in FIG. 3.

Referring to FIG. 3, a control circuit 10 converts the sine wave signal from the amplifier 4 into a rectangular wave signal A. A control pulse generation circuit 11 receives the rectangular wave signal A and then generates control pulses B at the leading edge and the trailing edge of the rectangular wave signal A. A resistor 12 and capacitor 13 form a time constant circuit to perform a charging operation according to the resistance value of the resistor 12 and the capacitance value of the capacitor 13. A charging and discharging circuit 14, which is connected to the control pulse circuit 11, discharges the storage charge of the capacitor 13 when it receives the control pulse B. In the discharge operation, the minimum value of the storage charge of the capacitor 13 is limited to the voltage V1, but does not drop less than the voltage V1. The connection point between the resistor 12 and the capacitor 13 produces a sawtooth wave signal C in which the voltage is discharged to the minimum voltage v1 every phase changeover operation. Resistors 15 and 16 are serially connected between the power supply VCC and the ground. The voltage V2 higher than the voltage V1 occurs from the intermediate connection point between the resistors 15 and 16. A first comparator 17 compares the sawtooth wave signal V with the voltage V2. In other words, the first comparator 17 produces a first comparison signal D which is in a high level during the period where the voltage V2 is higher than the sawtooth wave signal C, and in a low level during the period where the voltage V2 is lower than the sawtooth wave signal C.

The absolute value circuit 18 outputs an absolute value signal E corresponding to the absolute value of an intermediate value of the amplitude of each of the sine wave signals H+ and H− from the Hall element 3. An amplifier 19 amplifies the absolute value signal E with the amplification factor determined by the resistors 20 and 21 and then outputs the amplified signal F. The dc reference voltage for the absolute value signal E and the amplified signal F is determined by the reference power supply 32. The amplified signal F has a waveform that does not trigger sending the control pulse B and the comparison signal D to a sample and hold circuit (to be described later) 22. The sample and hold circuit 22 samples and holds the amplified signal F at the leading edge of the comparison signal D and then drops the amplified signal F to the minimum voltage of the absolute value signal E at the tailing edge of the comparison signal D, thus outputting a trapezoidal wave signal G. A second comparator 23 compares the absolute value signal E with the trapezoidal wave signal G and then outputs a second comparison signal H in a low level during the period where the trapezoidal wave signal G is higher than the absolute value signal E and outputs a second comparison signal H in a high level during the period where the trapezoidal wave signal G is lower than the absolute value signal E. The control circuit 10 produces a first drive signal I that turns on the first drive transistor 7 based on the second comparison signal H and a second drive signal J that turns on the second drive transistor 9 based on the second comparison signal H. Thus, the drive current IL1 flows through the drive coil 1 while the drive current IL2 flows through the drive coil 2 so that the motor runs.

As the drive signal I and the second drive signal J become a low level at a point near to the phase changeover point energizing the drive coils 1 and 2, the first and second drive transistors 7 and 9 are simultaneously turned off. Before the counter electromotive force Ec becomes small, the drive currents IL1 and IL2 becomes zero, so that a sharp drop of the drive currents IL1 and IL2 from a high level can be prevented. This operation enables the motor run silently without noise. Even when the amplitude difference between the sine wave signals H+ and H− varies due to variations in characteristic of the Hall element 3, or the period of the sine wave signal H+ or H− varies due to variations in rotational speed of the motor, the period where the first and second drive transistors 7 and 9 are simultaneously turned off becomes constant so that it can be prevented that the drive current IL1 sharply rises. Hence, the motor drive circuit is suitable for reducing noise of a variable speed motor.

The signal output operation of the motor drive circuit according to an embodiment will be described regarding the sawtooth wave signal C and the trapezoidal signal G of FIG. 3.

Figure 5:
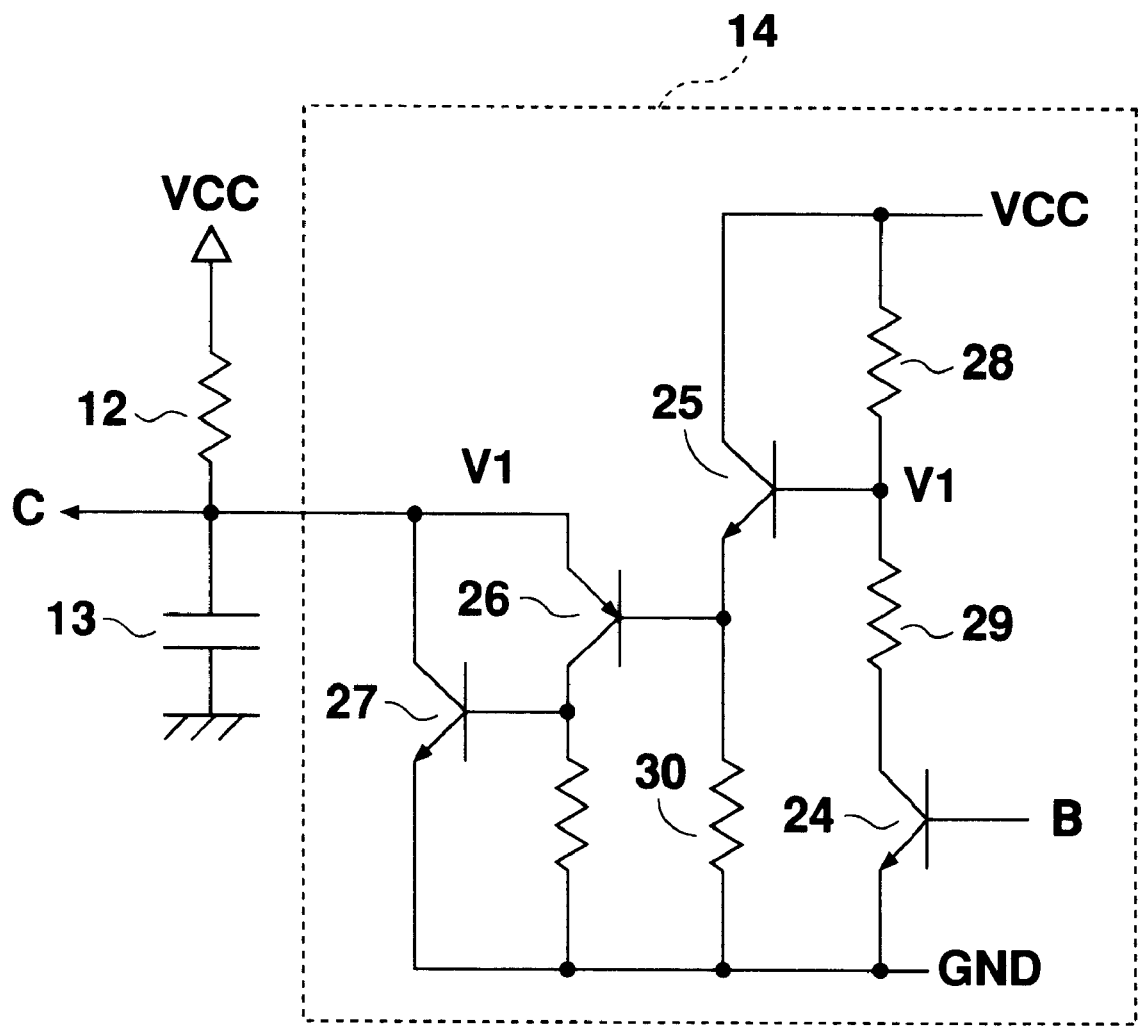
FIG. 5 is a diagram illustrating a sawtooth wave signal generation circuit according to an embodiment of the present invention.

FIG. 5 is a circuit diagram illustrating the charging and discharging control circuit 14 according to an embodiment of the present invention. Referring to FIG. 5, although the base voltage and the emitter voltage are at the same potential, the base voltage of the transistor 25 and the emitter voltage of the transistor 26 vary when the transistor 24 is turned on or off.

Referring to FIG. 5, when the control pulse B is not generated, the transistor 24 is turned off. The base voltage of the transistor 25 and the emitter voltage of the transistor 26 become the voltage Vmax obtained by subtracting the drop voltage across the resistor 28 from the power supply voltage VCC. The capacitor 13 is charged with the time constant determined by the resistance value of the resistor 12 and the capacitance value of the capacitor 13 so that the terminal voltage of the capacitor 13 rises. The generation period of the control pulse B depends on the revolution number of the motor. The time constant is set to the value that the charging voltage of the capacitor 13 does not reach the voltage Vmax during the generation period of the control pulse. When the control pulse B is being generated, the transistor 23 is turned on so that the base voltage of the transistor 25 and the emitter voltage of the transistor 26 become a divided voltage V1 (<Vmax) of the resistors 28 and 29. At this time, since the voltage of the non-grounded terminal of the capacitor 13 is higher than the voltage V1, the storage charge of the capacitor 13 is discharged to the voltage V1 via the transistor 27. This operation is repeated to generate the sawtooth wave signal C.

Figure 6:
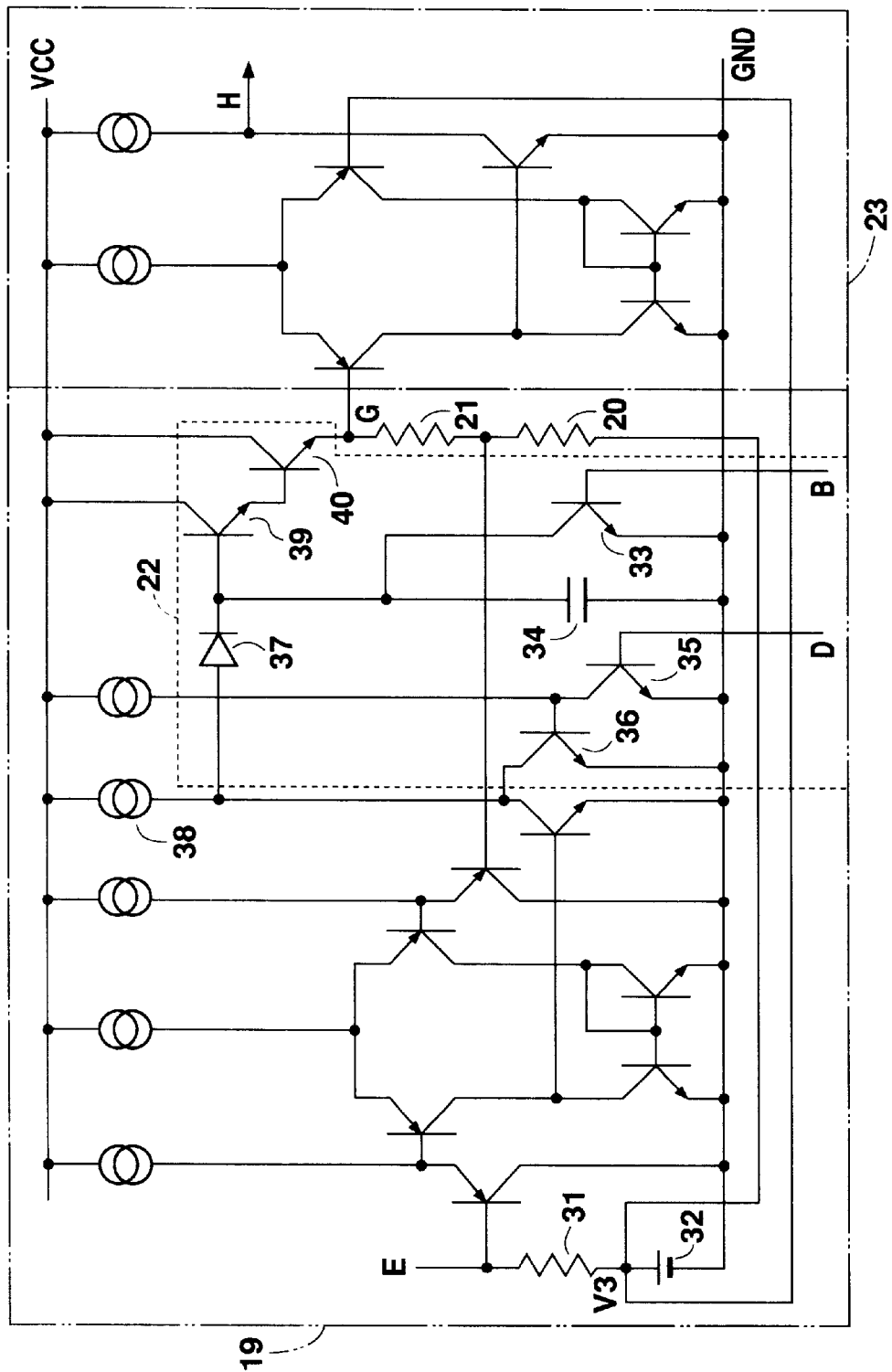
FIG. 6 is a diagram illustrating a trapezoidal signal generation circuit according to an embodiment of the present invention.

FIG. 6 is a circuit diagram illustrating the amplifier 19, the sample and hold circuit 22, and the comparator 23 according to another embodiment of the present invention.

Referring to FIG. 6, the amplifier 19 includes a serial circuit of a resistor 31 connected at the input portion for the absolute value signal E and a reference voltage 32'. The resistor 31 converts the absolute value signal E represented as current into a voltage with respect to the reference voltage 32'. The combination of the internal differential amplifier circuit and the current mirror circuit amplifies the voltage-converted absolute value signal E, with the amplification factor ((Ra+Rb)/Ra) determined by the resistance values Ra and Rb, and then outputs an amplified signal F. The sample and hold circuit 22 is connected between the output of the amplifier 19 and the output of the comparator 23. In the sample and hold circuit 22, when the control pulse occurs, the NPN transistor 33 is turned on so that the storage charge of the capacitor is discharged. In this operation, since the comparison signal D remains a high level until the sawtooth wave signal C exceeds the voltage 2 from an occurrence of the control pulse B, the transistor 35 is turned on and the transistor 36 is turned off. At a result, the capacitor 13 is charged via the diode 37. Thereafter, when the comparison signal D changes to a low level, the transistor 35 is turned off while the transistor 36 is turned on. Since the whole current of the current source 28 flows through the collector to emitter path of the transistor 34, the capacitor 34 stops charging so that the terminal voltage of the capacitor 34 is held. The Darlington-connected transistors 39 and 40 operate to suppress the discharge amount of the storage charge to a minimum value when the capacitor 34 is in a voltage holding state. This results in an occurrence the trapezoidal signal G.

In the present invention, since the duration where the first drive transistor and the second drive transistor are simultaneously turned off near to a phase changeover point of energizing the first coil and the second coil, the coil current can be nulled before the counter electromotive force becomes small. Hence, the problem of the coil current abruptly falling from a high level can be prevented so that the motor noise can be reduced. Furthermore, even when the amplitude of the sine wave signal varies because of characteristic variations of the Hall element or when the period of the sine wave signal because of variations in revolution speed of the motor, the duration of the period wherein the first drive transistor and the second drive transistor are simultaneously turned off can be maintained constant. Therefore, because an abrupt rise of the coil current can be prevented, the motor drive current of the present invention is suitable to reduce noise of variable speed motors.

Figure 7:
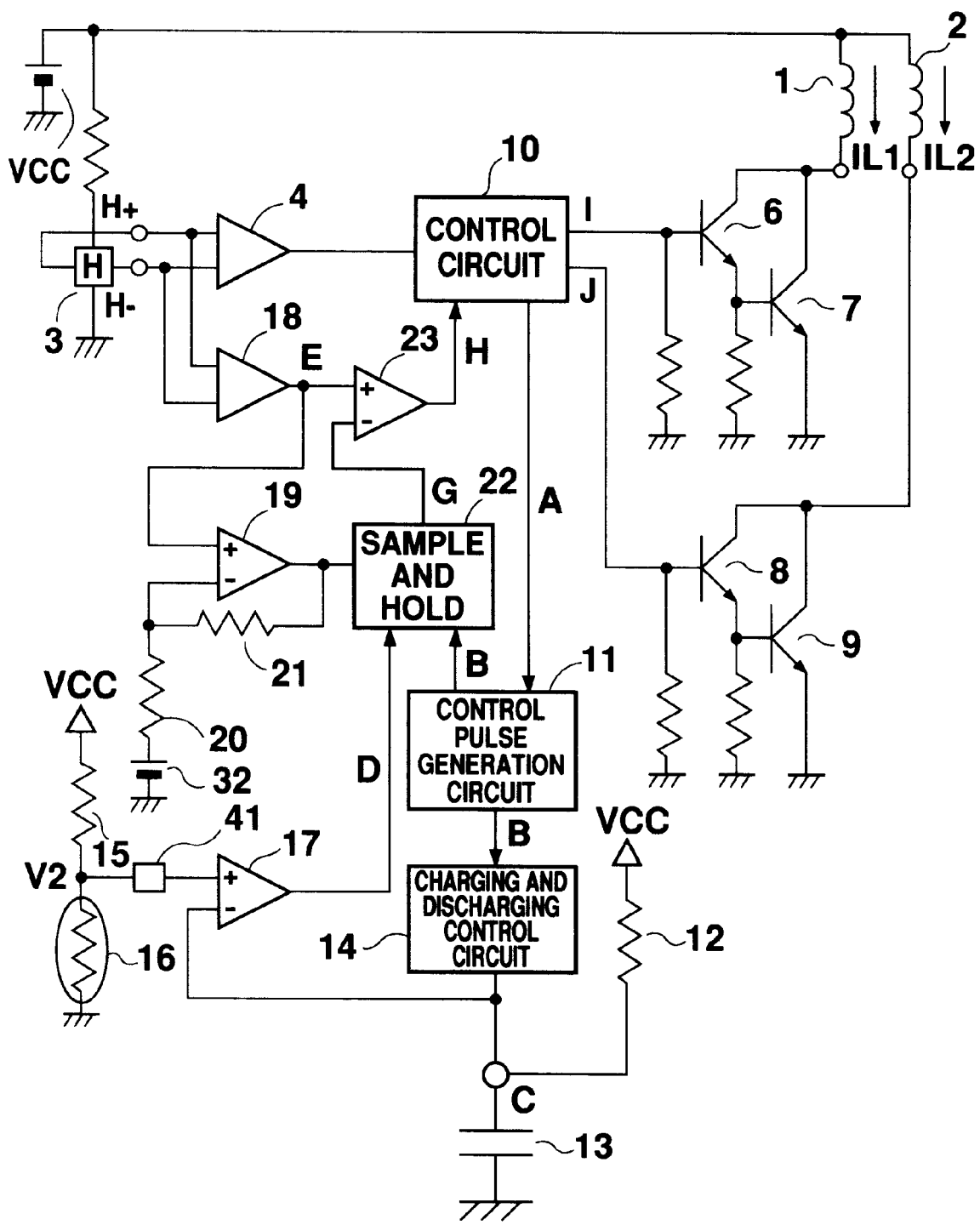
FIG. 7 is a diagram illustrating the configuration of a motor drive circuit according to a modified embodiment.

FIG. 7 shows a modification of the motor drive circuit of the present invention. In this example, a thermistor 16 varies resistance value according to temperature. As ambient temperature rises, the resistance value decreases while, as ambient temperature falls, the resistance value increases. The resistor 15 and the thermistor 16 are serially connected between the power supply VCC and the ground and generate the reference voltage V2 varying within a range of voltages higher than the voltage V1 from the intermediate connection point. The circuit shown in FIG. 7 is made in the form of an integrated circuit with the terminal 41. The intermediate connection point between the resistor 15 and the thermistor 16 is connected to the external terminal 41. Thus, the value of the resistor 15 and the value of the thermistor 15 can be arbitrarily set according to types of motors and applications. The first comparator 17 compares the sawthooth wave signal C with the reference voltage V2. The first comparator 17 outputs the first comparison signal D that becomes a high level for the duration where the reference voltage V2 is higher than the sawthooth wave signal C and that becomes a low level for duration where the reference voltage V2 is lower than the sawtooth wave signal C.

Figure 8:
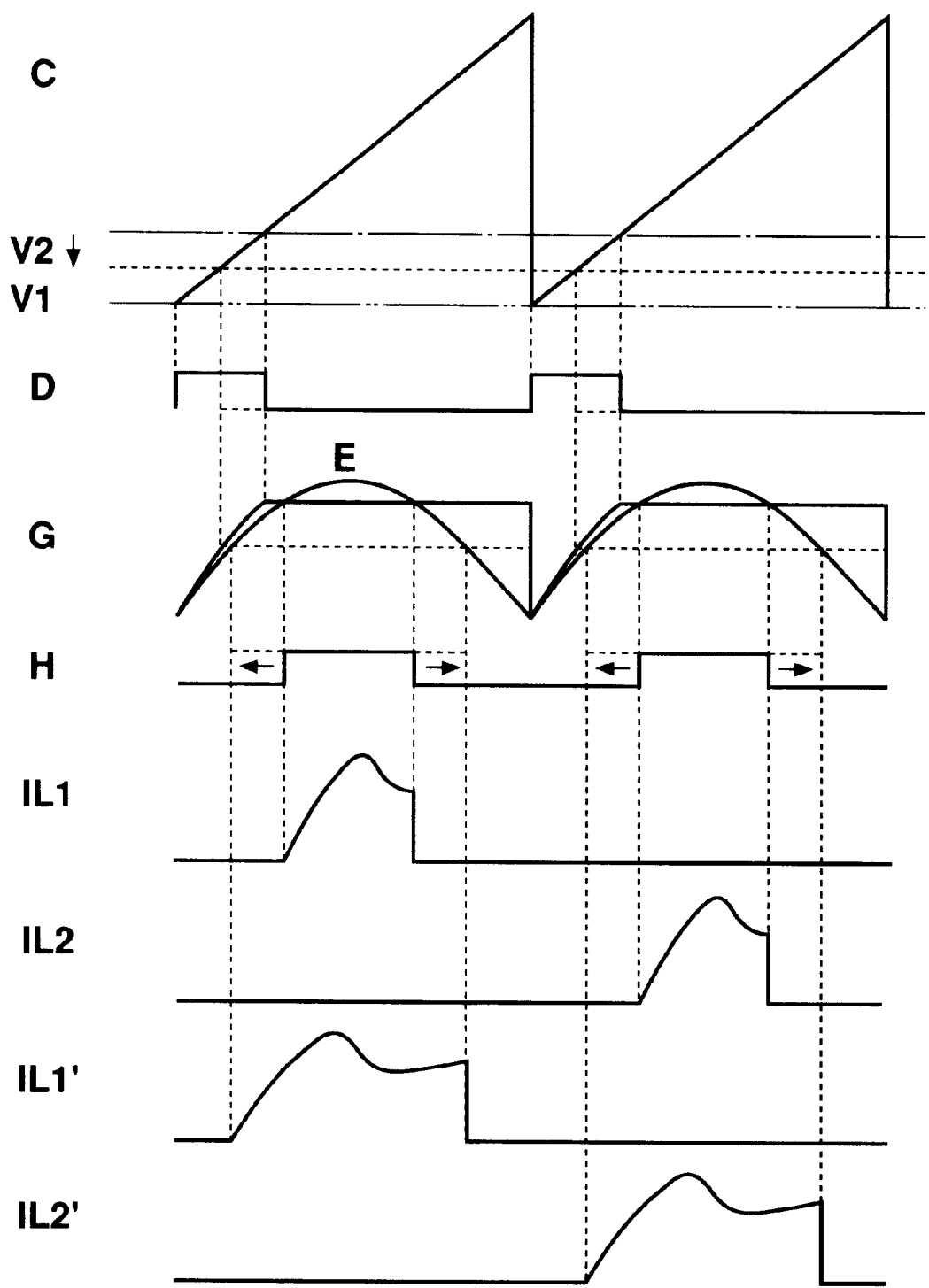
FIG. 8 is a diagram illustrating current waveforms at various points in a motor according to the present invention in ambient temperature changes.

FIG. 8 shows waveforms in the case where the value of a thermistor varies.

For example, when the ambient temperature increases, the resistance value of the resistor 16 decreases so that the reference voltage V2 decreases from the value shown with the broken line above to the value below shown with a dotted line. The high level duration of the first comparison signal D is shortened as shown with a dotted line. The high level duration of the second comparison signal H, that is, the motor drive time duration, is prolonged as shown with a dotted line. For a fan motor cooling the inside of a cabinet, the duration of energizing the drive coils 1 and 2 is prolonged (from IL1 to IL1' and from IL2 to IL2'), so that the cooling efficiency can be improved. Since the absolute value signal E is compared with the trapezoidal wave signal G, the first drive transistor 7 and the second drive transistor 9 are simultaneously turned off at the phase changeover point of the drive coils 1 and 2. Hence, the motor noises can be effectively reduced. Particularly in the case of a fan motor for cooling the inside of a cabinet, cooling efficiency can be improved.

Figure 9:
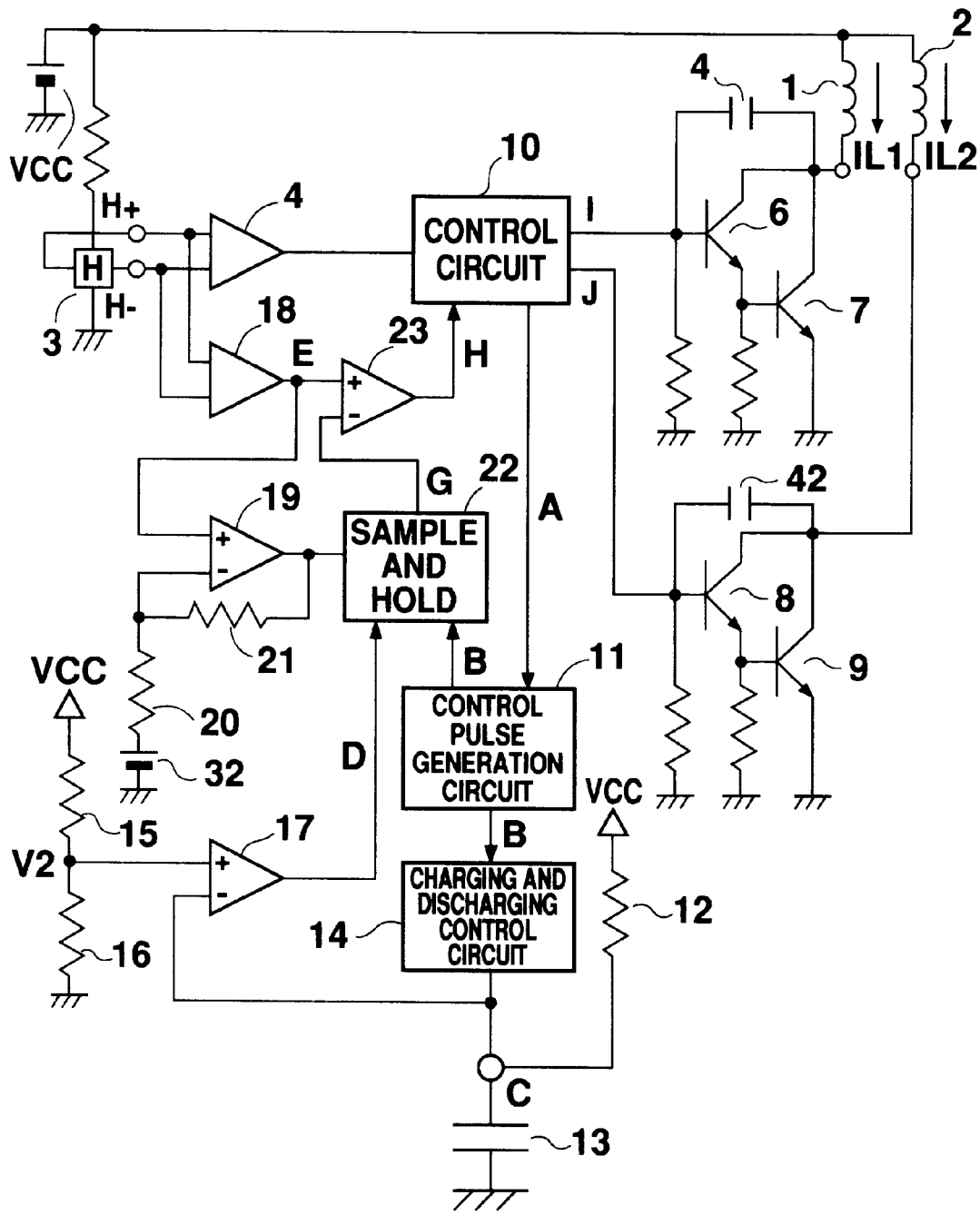
FIG. 9 is a diagram illustrating the configuration of a motor drive circuit according to another modified embodiment.

FIG. 9 illustrates another modification of the motor drive circuit of the present invention. In this example, a first capacitor 41 is connected between the base and the collector of the NPN transistor 6 while a second capacitor 42 is connected between the base and the collector of the NPN transistor 8. When a drive current flows through the first coil 1, the left terminal of the first capacitor 41 is positively charged and the right terminal of the first capacitor 41 is negatively charged. Hence, when the first drive signal I becomes a low level and the drive current IL1 does not flow, the potential of the right terminal of the first capacitor 41 rises while the potential of the left terminal of the first capacitor 41 rises by the same potential. In this operation, the NPN transistor 6 is gradually turned off while the drive current IL1 falls slantingly. This operation is applicable for the case of the drive current IL2. Thus, this modification can further reduce motor noise.

Figure 10:
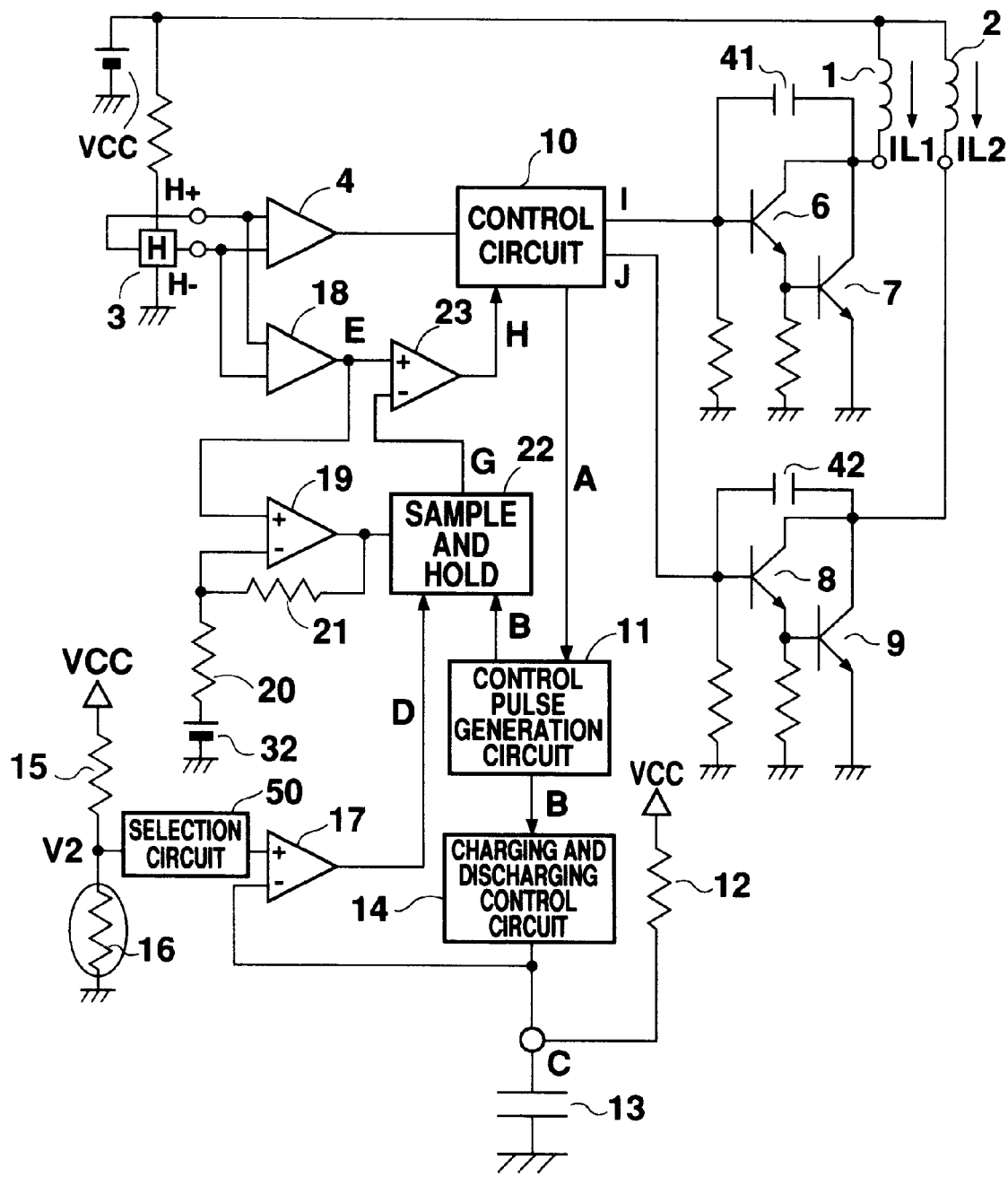
FIG. 10 is a diagram illustrating the configuration of a motor drive circuit according to further another modified embodiment.

FIG. 10 shows the configuration of a motor drive circuit according to a still further embodiment of the present invention. In this embodiment, a thermistor is used as the resistor 16. The capacitor 41 is connected between the collector and the base of the transistor 6. The capacitor 42 is connected between the collector and the base of the transistor 8.

The voltage V2 at the connection point between the resistor 15 and the thermistor 16 is not directly input to the first comparator 17 but is input to a selection circuit 50. The selection circuit 50 creates the voltage V2 or V4 or V5 according to the amplitude of the voltage V2.

Figure 11:
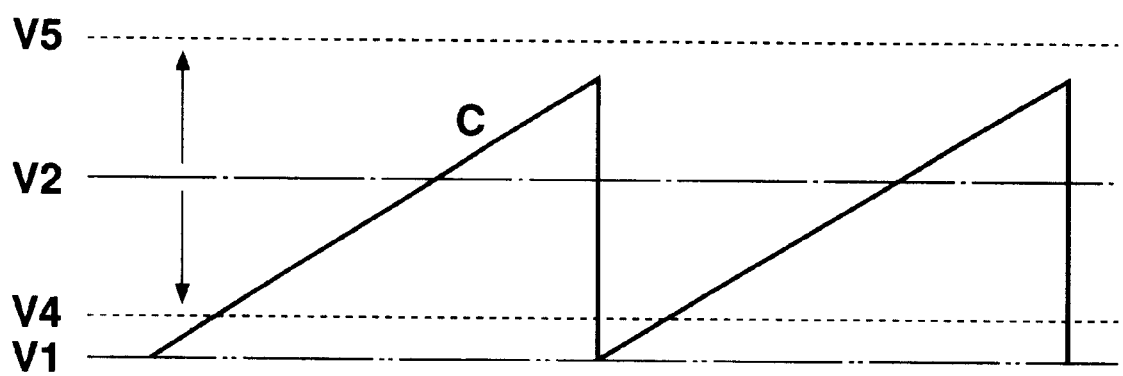
FIG. 11 is a diagram illustrating the operation of the selection circuit shown in FIG. 10.

The operation of the selection circuit 50 will be described here by referring to FIG. 11. When the voltage V2 is V4 or less, the selection circuit 50 outputs the voltage V4. When the voltage V2 is V5 or more, the selection circuit 50 outputs the voltage V5. When the voltage V2 is set to a voltage between V2 and V5, the selection circuit 50 outputs the voltage V2. Thus, the reference voltage input to the first comparator 17 is limited to a voltage between the voltages V4 and V5.

When the end point of the drive current IL1 exceeds the phase changeover point due to the capacitance of the capacitor 41 and the end point of the drive current IL2 exceeds the phase changeover point due to the capacitance of the capacitor 42 or when the end point of the drive currents IL1 and IL2 approaches the phase changeover point due to an increase in ambient temperature, the end point of the drive current IL1 and the starting point of the drive current IL2 overlap. Hence, it becomes difficult to null the drive currents IL1 and IL2 near to the phase changeover point. This produces reactive current, thus resulting in decreased motor drive efficiency.

According to the present invention, even when the ambient temperature increases, the reference voltage input to the first comparator 17 does not fall to or below the voltage. Thus, because the drive currents IL1 and IL2 are consistantly turned off near the phase changeover point of the motor drive current, any decrease in the efficiency of the motor drive can be prevented.

Figure 12:
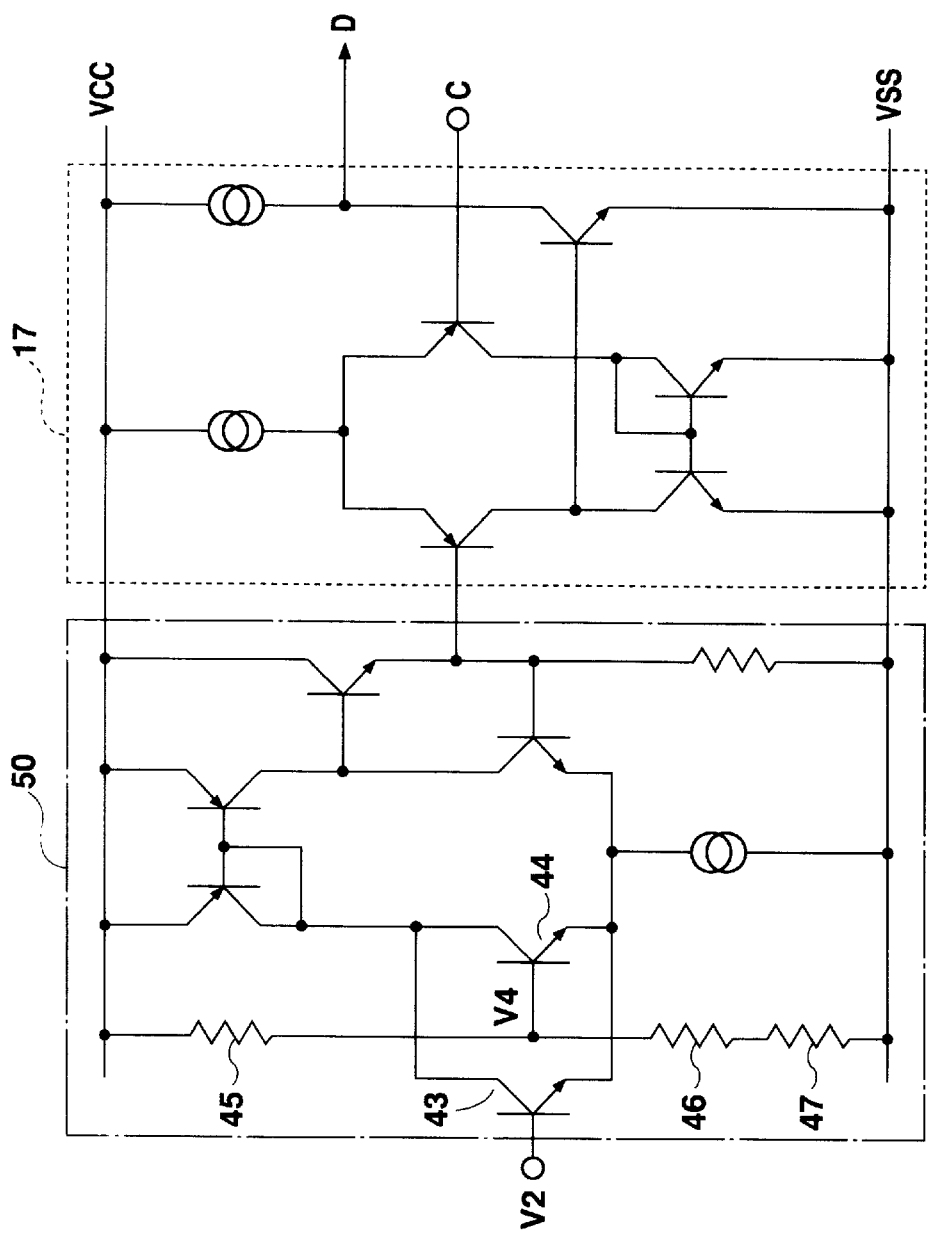
FIG. 12 is a diagram illustrating the operation of each of the selection circuit and the first comparator shown in FIG. 10.

FIG. 12 is a circuit diagram illustrating the comparator 17 and the selection circuit 50 according to an embodiment of the present invention. In normal temperatures, the voltage V2 is set to a value between the voltage V4 and the voltage V5 under the influence of the resistance value of the thermistor 16.

Referring to FIG. 12, NPN transistors 43 and 44 are differentially connected. The voltage V2 is applied to the base of the NPN transistor 43. The voltage V4 divided by the resistors 45, 46 and 47 is applied to the base of the NPN transistor 44. The composite resistance of the resistors 45 and 46 is equal to the resistance value of the resistor 28, 29, or 47. In other words, the voltage V4 is higher than the voltage V1. Hence, when the voltage V2 is higher than the voltage V4, the NPN transistor 43 is turned on, so that the reference voltage V2 is applied to one input of the comparator 17. Thus, the comparator 17 compares the sawtooth wave signal C with the reference voltage V2. When the voltage V2 becomes lower than the voltage V4 due to an increase in ambient temperature, the NPN transistor 44 is turned on, so that the voltage V4 is applied to one input of the comparator 17. The comparator 17 compares the sawtooth wave signal with the reference voltage V4. The reference voltage V4 is a value by which the first comparison signal D can be shortened by only the duration T3. This can prevent an overlap between the drive currents IL1 and IL2, that is, the occurrence of reactive current. Moreover, when an ambient temperature drops and the voltage V2 is higher than the voltage V5 obtained by dividing with the series resistors 48 and 49, the PNP transistor 50 is turned off while the PNP transistor 51 is turned on. The comparator 17 compares the sawtooth wave signal C with the reference voltage V5. In this operation, the reference voltage V2 is limited to a value between the minimum voltage V4 and the maximum voltage V5. Thus, a fan can be adapted to normally-rotated apparatuses according to ambient temperatures. The function of limiting the upper value and the lower value of the reference voltage shown in FIG. 11 can be integrated in one chip form.

What is claimed is:

1. A motor drive circuit, wherein a motor drive current is supplied to a first coil and to a second coil of a motor, said motor drive current being generated based on a sine wave signal according to relative position relationships between a stator and a rotor of said motor, comprising:

a first drive transistor for supplying a first motor drive current to said first coil based on said sine wave signal and a second drive transistor for supplying a second motor drive current to said second coil based on said sine wave signal, said first drive current and said second drive current being complementarily to each other; and a drive transistor control circuit for comparing a amplification absolute value signal with an absolute value signal of said sine wave signal, said amplification absolute value signal being obtained by amplifying said absolute value signal with a predetermined amplification factor, and turning on said first drive transistor and said second drive transistor only when the difference between said amplification absolute value signal and said absolute value signal exceeds a predetermined amount.

2. The motor drive circuit defined in claim 1, wherein said drive transistor control circuit comprises;

a sawtooth signal generation circuit for generating a sawtooth signal by performing a charging operation according to a predetermined time constant and performing a discharging operation with a timing when said first coil and said second coil is selectively driven;

a first comparator circuit for comparing said sawtooth signal with a reference voltage higher than the minimum voltage of said sawtooth signal and then outputting a first comparison signal with a logical level during a predetermined period from the time when said sawtooth signal is discharged;

a sample and hold circuit for sampling and holding an amplification absolute value signal obtained by amplifying the absolute value signal of said sine wave signal at the end of said logical level of said first comparison signal to hold the amplitude thereof, and then outputting a trapezoidal wave signal by nulling said held amplitude at the leading edge of said logical level of said first comparison signal; and a second comparator circuit for comparing said absolute value signal with said trapezoidal wave signal and for outputting a second comparison signal to simultaneously turn off said first drive transistor and said second drive transistor near the point where a drive current is switched to said first coil or said second coil.

3. The motor drive circuit defined in claim 2, further comprising a control pulse generation circuit for generating a control pulse with the timing when said first coil and said second coil is selectively switched in a drive operation based on said sine wave signal; and wherein said sawtooth signal generation circuit generates said sawtooth signal by performing a discharging operation at the time when said control pulse is supplied.

4. The motor drive circuit defined in claim 2, wherein said reference voltage supplied to said first comparison circuit varies in response to changes in temperature.

5. The motor drive circuit defined in claim 4, wherein said reference voltage is supplied via an external terminal.

6. The motor drive circuit defined in claim 2, further comprising a slope circuit for sloping the trailing edge of a drive current passing through each of said first coil and said second coil.

7. The motor drive circuit defined in claim 6, wherein said slope circuit has a capacitor connected between the base and the collector of said first transistor and a capacitor connected between the base and the collector of said second transistor.

8. The motor drive circuit defined in claim 4, further comprising a slope circuit for sloping the trailing edge of a drive current flowing through each of said first coil and said second coil.

9. The motor drive circuit defined in claim 8, wherein said reference voltage varying due to temperature variations is limited based on a predetermined lower limit value.

10. A motor drive circuit, wherein a motor drive current is supplied to a first coil and a second coil of a motor, said motor drive current being generated based on sine wave signals according to relative position relationships between a stator and a rotor of said motor, comprising:

a first transistor for supplying a first motor drive current to said first coil based on said sine wave signal and a second transistor for supplying a second motor drive current based on said sine wave signal, said first drive current and said second drive current being complementarily to each other; and a drive transistor control circuit for simultaneously turning off said first drive transistor and said second drive transistor for a predetermined period of time, near a point where a drive current is switched to said first coil or said second coil.

* * * * *